United States Patent [19]

Radun

[11] Patent Number: 5,404,091

[45] Date of Patent: Apr. 4, 1995

[54] SWITCHED RELUCTANCE GENERATOR SYSTEM WITH SELF-EXCITATION CAPABILITY DURING LOAD FAULTS

[75] Inventor: Arthur V. Radun, Ballston Lake, N.Y.

[73] Assignee: General Electric Company, Schenectady, N.Y.

[21] Appl. No.: 101,623

[22] Filed: May 27, 1993

[51] Int. Cl.[6] .............................. H02P 8/00; H02P 9/00
[52] U.S. Cl. ..................................... 322/94; 318/696; 318/701
[58] Field of Search ................... 322/10, 94, 29, 100; 290/38 R, 46; 318/254, 696, 701

[56] References Cited

U.S. PATENT DOCUMENTS

| 3,678,352 | 7/1972  | Bedford .        |           |
|-----------|---------|------------------|-----------|
| 4,143,308 | 3/1979  | Deplante et al.  | 318/701 X |
| 4,442,396 | 4/1984  | Hucker           | 322/21    |
| 4,707,650 | 11/1987 | Bose             | 318/685   |
| 4,710,840 | 12/1987 | Shepler et al.   | 361/20    |
| 4,896,088 | 1/1990  | Jahns            | 318/696   |
| 4,896,089 | 1/1990  | Kliman et al.    | 318/701   |
| 4,998,052 | 3/1991  | Erdman et al.    | 318/701   |
| 5,006,781 | 4/1991  | Schultz et al.   | 322/25    |
| 5,012,177 | 4/1991  | Dhyanchand et al.| 322/10    |
| 5,043,643 | 8/1991  | Hedlund et al.   | 318/701 X |
| 5,115,181 | 5/1992  | Sood             | 318/701   |
| 5,138,244 | 8/1992  | Bahn             | 318/254 X |
| 5,214,365 | 5/1993  | Bahn             | 318/701   |
| 5,260,635 | 11/1993 | Bahn             | 318/701   |
| 5,274,287 | 12/1993 | Bahn             | 318/701 X |
| 5,278,482 | 1/1994  | Bahn             | 318/701   |
| 5,289,107 | 2/1994  | Radun et al.     | 322/94    |

*Primary Examiner*—Kristine L. Peckman
*Attorney, Agent, or Firm*—Jill M. Breedlove; Marvin Snyder

[57] ABSTRACT

A switched reluctance generator system, including a converter for coupling a dc voltage via a dc excitation bus to a switched reluctance generator and thereby providing excitation power thereto, has a separate generator bus for providing the output voltage of the switched reluctance generator. The generator bus is separate and distinct from the dc excitation bus such that the average output current generated by the switched reluctance generator is substantially independent of the generator output voltage. The switched reluctance generator system further includes switches for coupling each respective machine phase winding of the switched reluctance generator to the generator bus such that the generator provides power to the excitation bus when the switches are turned off and provides power to the generator bus when the switches are turned on. As a result, the switched reluctance generator system is self-excited after generating action is initiated, even during load faults, and is furthermore capable of resuming normal generating operation following occurrence of a short-circuit fault.

4 Claims, 7 Drawing Sheets

SWITCHED RELUCTANCE GENERATOR SYSTEM WITH SELF-EXCITATION CAPABILITY DURING LOAD FAULTS

This application is related to commonly assigned U.S. patent application No. 08/067,879 of A. V. Radun, filed concurrently herewith and incorporated by reference herein.

1. Field of the Invention

The present invention relates generally to switched reluctance generator systems and, more particularly, to a switched reluctance generator system with self-excitation capability after generating action is initiated, even during load faults.

2. Background of the Invention

A switched reluctance machine is a brushless, synchronous machine which has an unequal number of salient rotor and stator poles. There is a concentrated winding on each of the stator poles, but no windings or permanent magnets on the rotor. The stator pole windings on opposite stator poles are energized simultaneously. Ideally, the flux entering the rotor from one stator pole balances the flux leaving the rotor from the diametrically opposite stator pole, so that there is no mutual magnetic coupling among the phases.

In operation, there is an electromagnetic force of attraction between the rotor poles and stator poles of a switched reluctance machine. Hence, by properly positioning the stator phase excitation waveforms relative to the rotor angular position, forward or reverse operation and motoring or generating operation can be achieved. In particular, if the windings of two diametrically opposite stator poles are excited when a pair of rotor poles are approaching alignment with these excited stator poles, motoring torque is produced; and when the rotor poles are moving out of alignment with the excited stator poles, generating torque is produced.

A switched reluctance generator system is typically a self-excited system that draws its excitation power from the same dc bus into which it generates power. Such a system is electromagnetically limited to a maximum load current that it is capable of delivering without losing its self-excitation. If the maximum load current for the particular switched reluctance generator system is exceeded, e.g., in case of a fault such as a short circuit, then the generated output voltage drops to zero. Unfortunately, since the system is self-excited, once the voltage drops to zero, generating operation cannot be resumed without external intervention; and a relatively large power source is required to supply the overload, clear the fault and re-excite the generator.

Commonly assigned U.S. patent application No. 07/968,642 of A. V. Radun et al., filed Oct. 29, 1992, now U.S. Pat. No. 5,289,107 which is a continuation-in-part of now abandoned U.S. patent application No. 07/859,754, describes a switched reluctance generator system having an excitation bus for providing excitation power thereto which is separate and distinct from a generator bus for providing the output voltage thereof. As a result, the average output current generated by the switched reluctance generator is substantially independent of the generator output voltage. Advantageously, therefore, the switched reluctance generator of U.S. patent application No. 07/968,642 is capable of automatically resuming normal generating operation following occurrence of a short-circuit fault, without requiring a relatively large external power source to supply the high short-circuit current, clear the fault and re-excite the generator.

However, for a switched reluctance generator system having two separate busses, i.e., an excitation bus and a generator bus, the source of excitation power for the switched reluctance generator, especially during load faults, is at issue. As described in U.S. patent application No. 07/968,642 of A. V. Radun et al., cited hereinabove, unless multiple generator outputs are available such that one of the generator outputs may be employed to provide machine excitation during a fault, a separate excitation source is required. Accordingly, it is desirable to provide a switched reluctance generator with self-excitation capability, even during load faults, without requiring multiple generator outputs.

SUMMARY OF THE INVENTION

A switched reluctance generator system, including a converter for coupling a dc voltage via a dc excitation bus to a switched reluctance generator and thereby providing excitation power thereto, has a separate generator bus for providing the output voltage of the switched reluctance generator. The generator bus is separate and distinct from the dc excitation bus such that the average output current generated by the switched reluctance generator is substantially independent of the generator output voltage. The switched reluctance generator system of the present invention further includes switch means for coupling each respective machine phase winding of the switched reluctance generator to the generator bus such that the generator provides power to the excitation bus when the switch means are turned off and provides power to the generator bus when the switch means are turned on. As a result, the switched reluctance generator system is self-excited after generating action is initiated, even during load faults, and is furthermore capable of resuming normal generating operation following occurrence of a short-circuit fault.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1A:
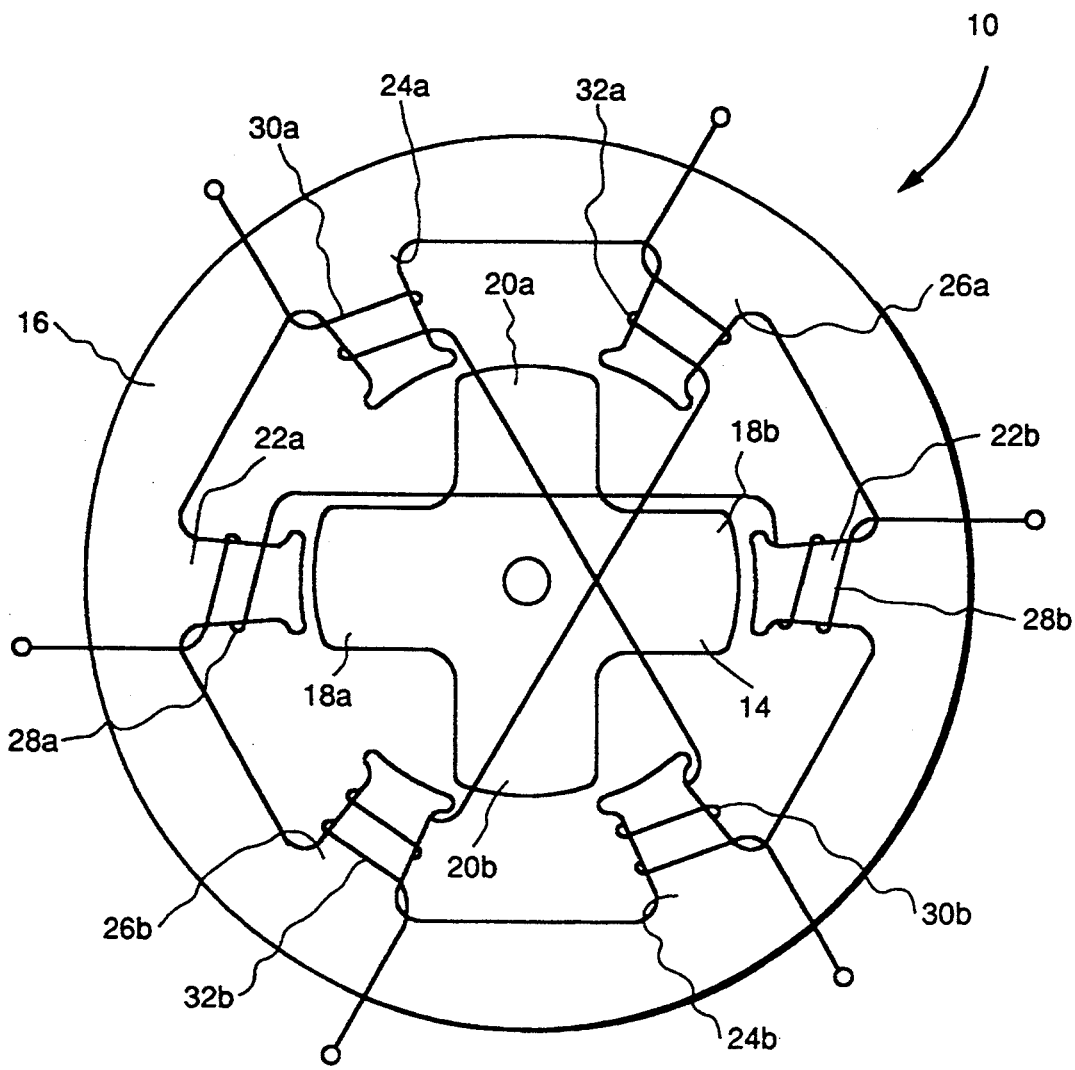
FIG. 1A schematically illustrates a typical switched reluctance machine.

FIG. 1A shows a typical switched reluctance machine configuration. By way of example, switched reluctance machine 10 is illustrated as a three-phase machine, including a rotor 14 rotatable in either a forward or reverse direction within a stationary stator 16. Rotor 14 has two pairs of diametrically opposite rotor poles 18a–18b and 20a–20b. Stator 16 has three pairs of diametrically opposite stator poles 22a–22b, 24a–24b and 26a–26b. Stator pole windings 28a–28b, 30a–30b and 32a–32b, respectively, are wound on stator pole pairs 22a–22b, 24a–24b and 26a–26b, respectively. Conventionally, the stator pole windings on each pair of opposing or companion stator pole pairs are connected in series or in parallel to form a machine phase winding.

Figure 1B:
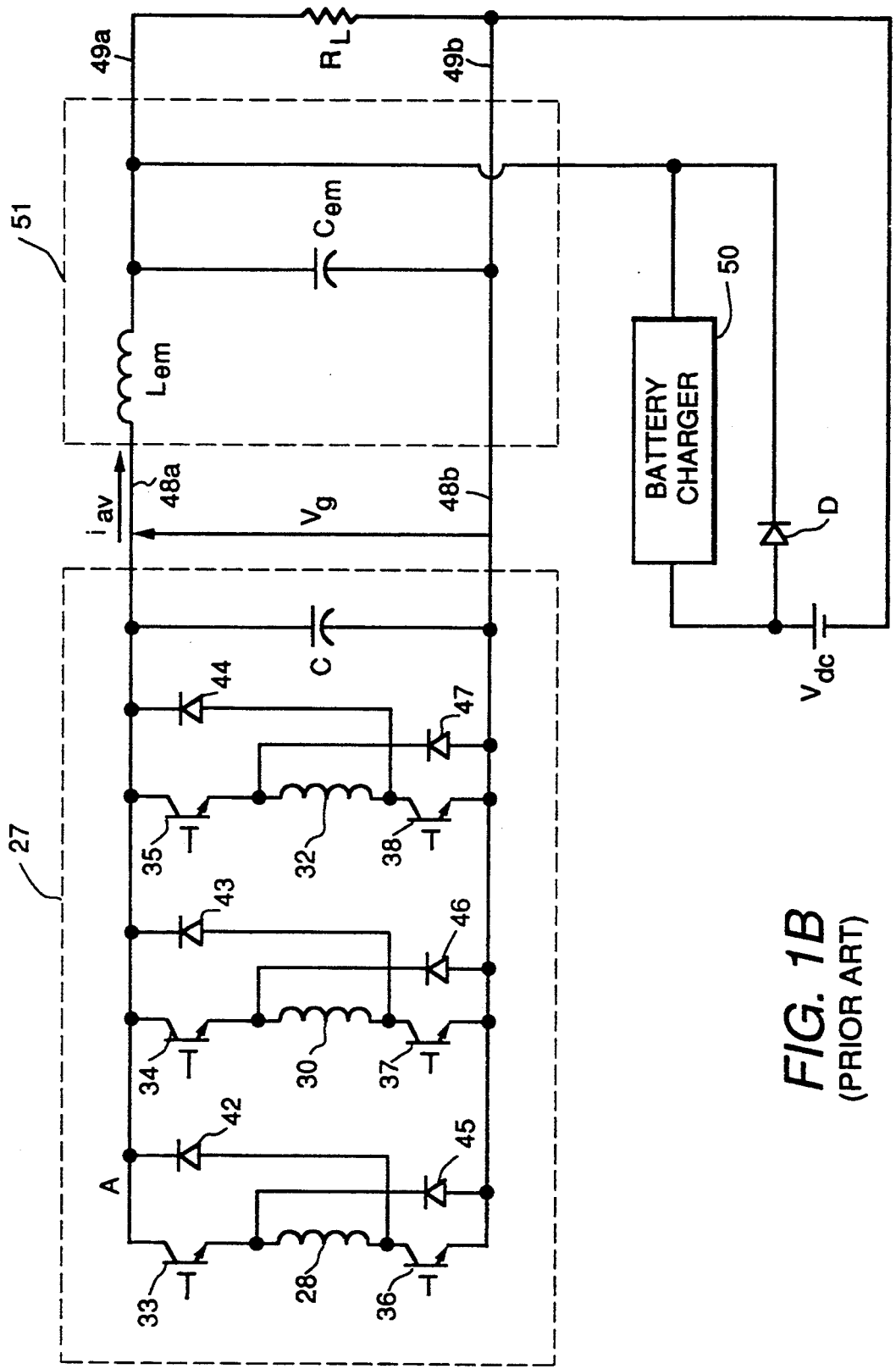
FIG. 1B schematically illustrates a typical switched reluctance generator system.

FIG. 1B illustrates a typical switched reluctance generator system including a converter 27. As illustrated in FIG. 1B, the stator pole windings comprising each companion pair 28, 30 and 32, respectively, are connected in series with each other and with an upper current switching device 33, 34 and 35, respectively, and with a lower current switching device 36, 37 and 38, respectively. The upper and lower switching devices are shown as comprising an insulated gate bipolar transistor (IGBT), but other suitable current switching devices may be used; for example, field effect transistors (FET's), gate turnoff thyristors (GTO's), MOS-controlled thyristors (MCT's) or bipolar junction transistors (BJT's). Each phase winding is further coupled to generator output bus terminals 48a and 48b by flyback or return diodes 42 and 45, 43 and 46, and 44 and 47, respectively. Each series combination of a phase winding with two corresponding switching devices and two flyback diodes comprises one phase leg of converter 27. The converter phase legs are connected in parallel with each other and are connected to the generator output bus terminals 48a and 48b. Capacitance C is also connected to the generator output bus in order to absorb ripple current produced by the machine phases, thereby filtering the dc voltage $V_g$ developed across the generator output bus terminals. The generator system of FIG. 1B is also shown as including an electromagnetic interference filter 51 of a well-known type comprising a capacitance $C_{em}$ and an inductance $L_{em}$. Resistance $R_L$ coupled in parallel with capacitance $C_{em}$ represents the generator load. FIG. 1B also includes a dc source $V_{dc}$, such as a battery or rectified ac source, which is connected to the load output terminals 49a and 49b via the parallel combination of a diode D and a battery charger 50.

In order to establish excitation in the switched reluctance generator during initial start-up, dc voltage is applied to the load bus terminals 49a and 49b by source $V_{dc}$ via the forward-biased diode D. Thereafter, during normal generating operation, the generator bus voltage $V_g$ is greater than the source voltage $V_{dc}$ so that diode D is reverse-biased, and the dc generator bus voltage $V_g$ self-excites the generator machine windings. Disadvantageously, however, if an excessive overload condition, such as a short circuit, occurs, then the generator output voltage $V_g$ falls to zero, resulting in loss of the machine's self-excitation. Diode D becomes forward-biased under these conditions such that the dc source must be large enough to supply the full short-circuit current until the fault is cleared by blowing a fuse or opening a circuit breaker. Restoration of normal generating operation following the fault requires that the dc source have sufficient reserve capacity to apply recovery voltage $V_{dc}$ to the generator bus terminals 48a and 48b via diode D and inductor Lem in order to re-excite the generator.

Figure 2:
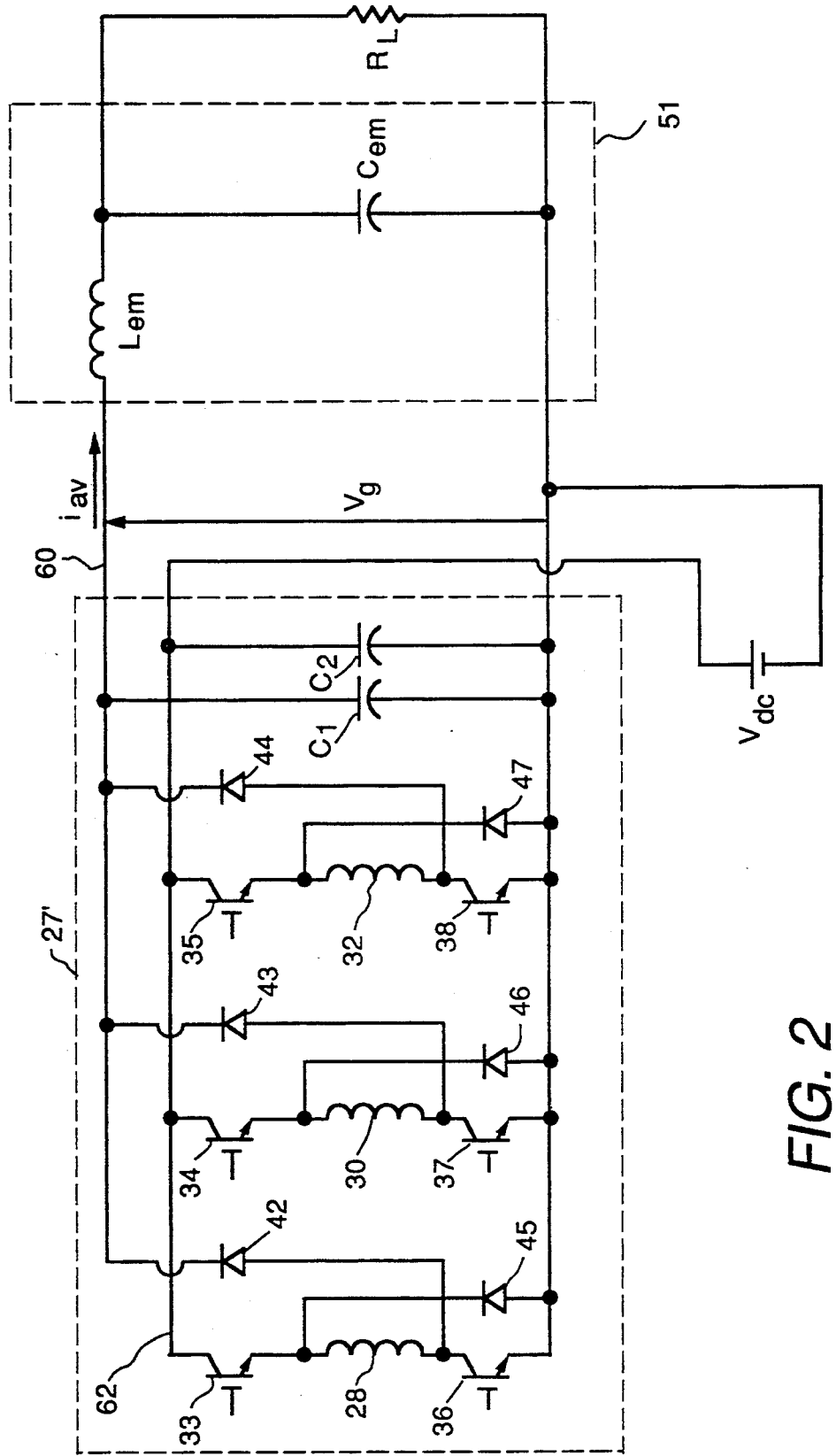
FIGS. 2, 3, 4A and 4B schematically illustrate alternative embodiments of switched reluctance generator systems having separate excitation and generator busses such as those described in U.S. patent application No. 07/968,642, now U.S. Pat. No. 5,289,107 cited hereinabove.

FIG. 2 illustrates a switched reluctance generator system according to U.S. patent application No. 07/968,642, cited hereinabove, having a generator bus 60 for providing the generator output voltage that is separate and distinct from an excitation bus 62. As shown, excitation bus 62 is directly coupled to the dc source $V_{dc}$ and to the upper switching devices 33–35 of converter 27', and generator bus 60 is coupled to the cathodes of upper flyback diodes 42–44. Separate filter capacitances $C_1$ and $C_2$ are provided for the separate busses 60 and 62, respectively. With this configuration, the average generator output current $i_{av}$ depends only on the availability of excitation voltage $V_{dc}$ and can be controlled to be independent of the generated voltage $V_g$. Hence, in the event of an excessive overload or short-circuit load fault, generating action is maintained by the switched reluctance generator. The source $V_{dc}$ is thus required to provide the machine excitation power during normal generating operation as well as operation under fault conditions.

Figure 3:
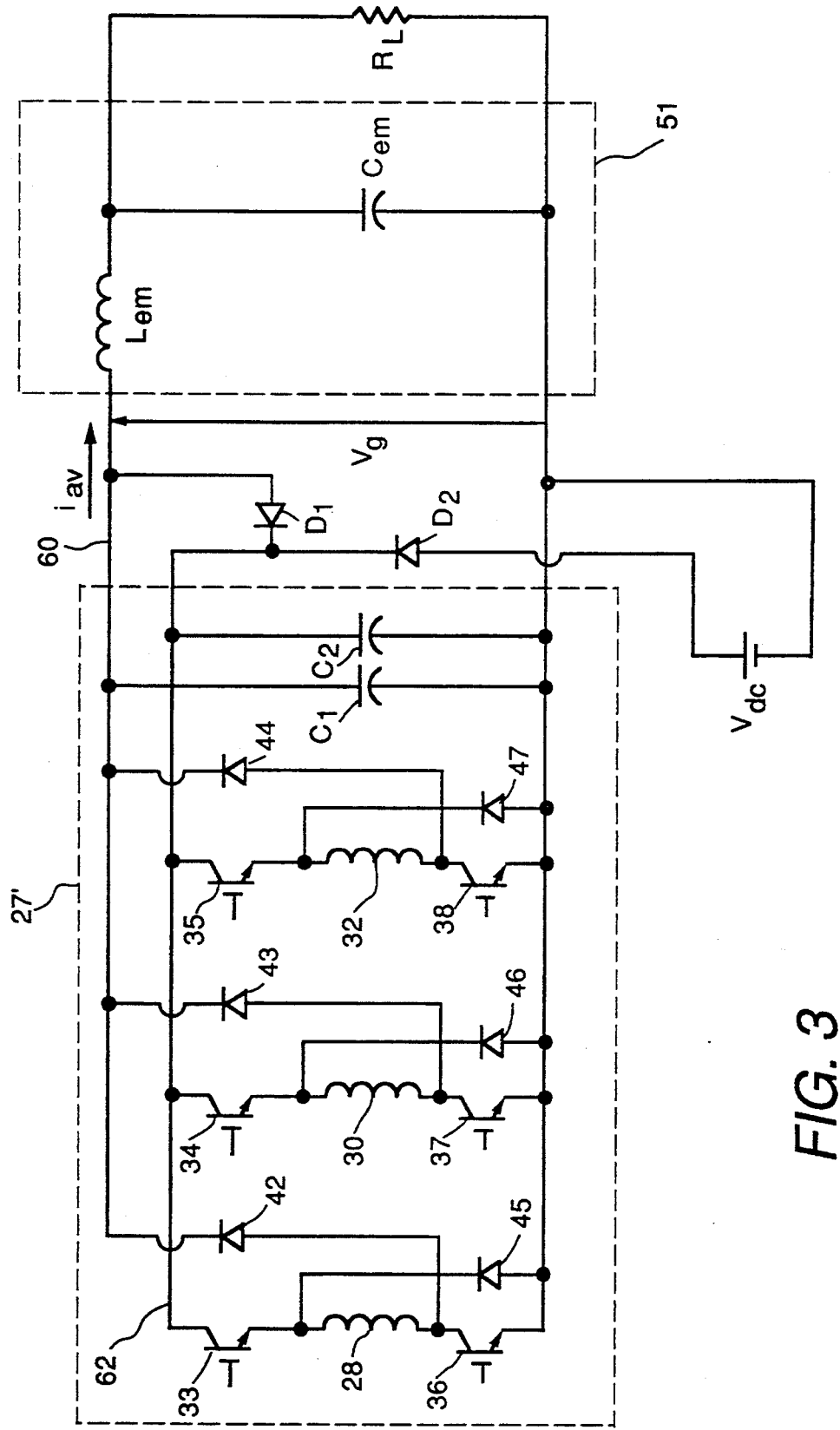

FIG. 3 illustrates an alternative embodiment of the switched reluctance generator system of FIG. 2 according to U.S. patent application No. 07/968,642, cited hereinabove. Specifically, the anode of a diode $D_1$ is connected to generator bus 60, and the cathode of diode D1 is connected to excitation bus 62. In addition, the cathode of another diode $D_2$ is connected to excitation bus 62, and the anode of diode $D_2$ is connected to the dc source $V_{dc}$. During normal generating operation, generator bus voltage $V_g$ is greater than source voltage $V_{dc}$ such that diode $D_1$ is forward-biased, and diode $D_2$ is reverse-biased such that the generated output voltage $V_g$ provides power to the excitation bus to maintain generating operation. In case of an excessive overload or short-circuit fault, however, diode D1 becomes reverse-biased when $V_g$ drops below $V_{dc}$, and diode $D_2$ is forward-biased such that the dc source $V_{dc}$ provides power to the excitation bus in order to maintain generating action. Hence, the source $V_{dc}$ is only required to provide excitation power during a fault, rather than full output power delivered to the fault. Moreover, during normal operation, the source $V_{dc}$ is not required to supply any power.

Figure 4A:
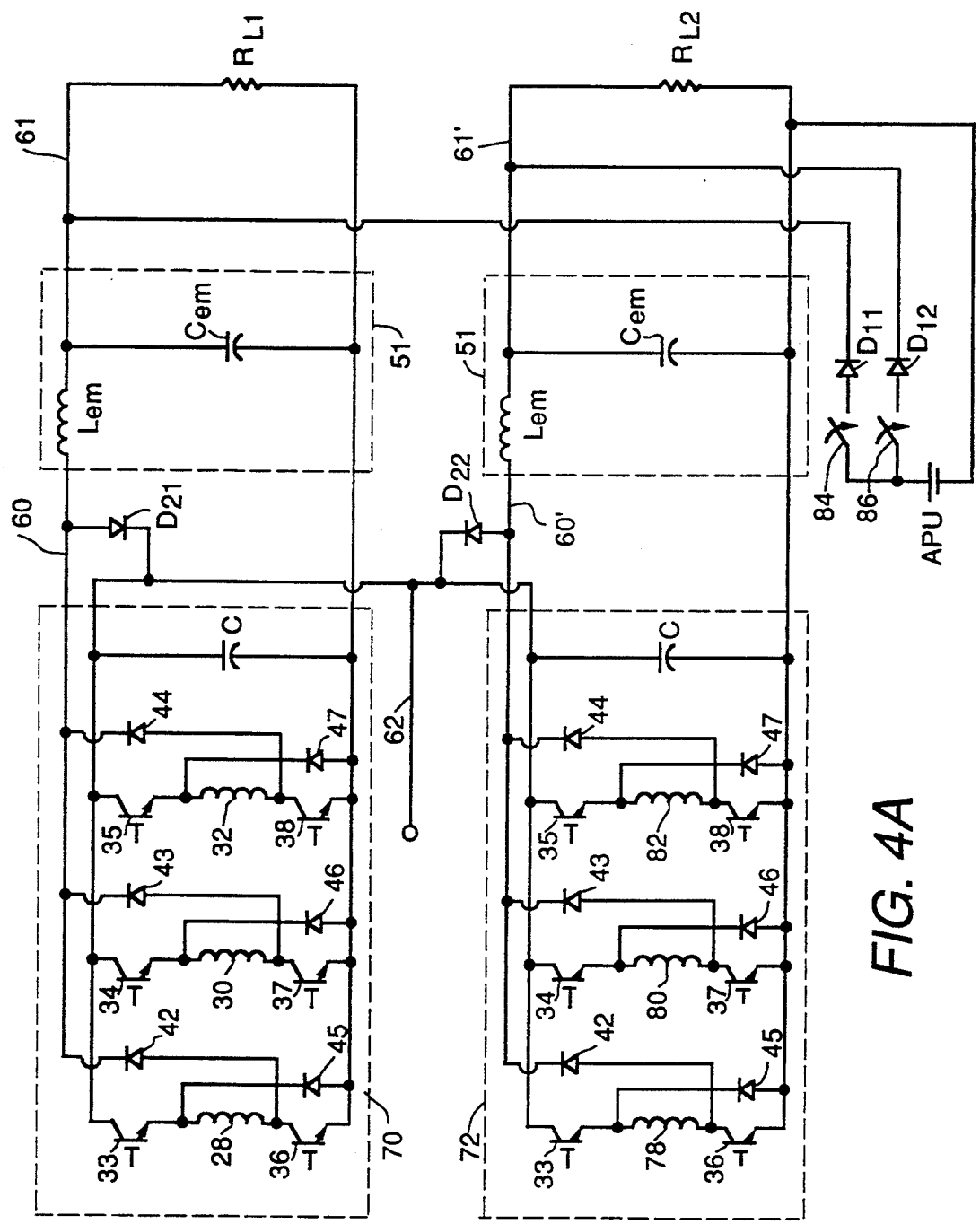

FIG. 4A illustrates another alternative embodiment of a switched reluctance generator system according to U.S. patent application No. 07/968,642, cited hereinabove, wherein a plurality of converters are employed to excite the generator. By way of example, two three-phase converters 70 and 72 are shown for driving six phase windings 28, 30, 32, 78, 80 and 82 of a six-phase switched reluctance generator. The system of FIG. 4A includes diode-0R means comprising a first diode, $D_{11}$ and $D_{12}$, respectively, coupled, via a switch, 84 and 86, respectively, between an auxiliary power unit APU source and each respective output load bus 61 and 61', and further comprising a second diode $D_{21}$ and $D_{22}$, respectively, coupled between each respective generator bus, 60 and 60', respectively, and the excitation bus 62. Initially, to start the generator, switches 84 and 86 are closed, and power is provided by the APU source to the excitation bus 62 via diodes $D_{11}$, $D_{12}$, $D_{21}$ and $D_{22}$ in order to excite the generator. Thereafter, during normal generating operation, switches 84 and 86 are open, and the APU source is shut down; and generating operation is maintained with the generator busses 60 and 60' supplying power to the excitation bus 62. In case of an excessive overload or short-circuit fault on either generator bus 60 or 60', but not both, the diode-OR means ensures that the other generator bus provides excitation in order to maintain generating operation on both generator busses.

Figure 4B:
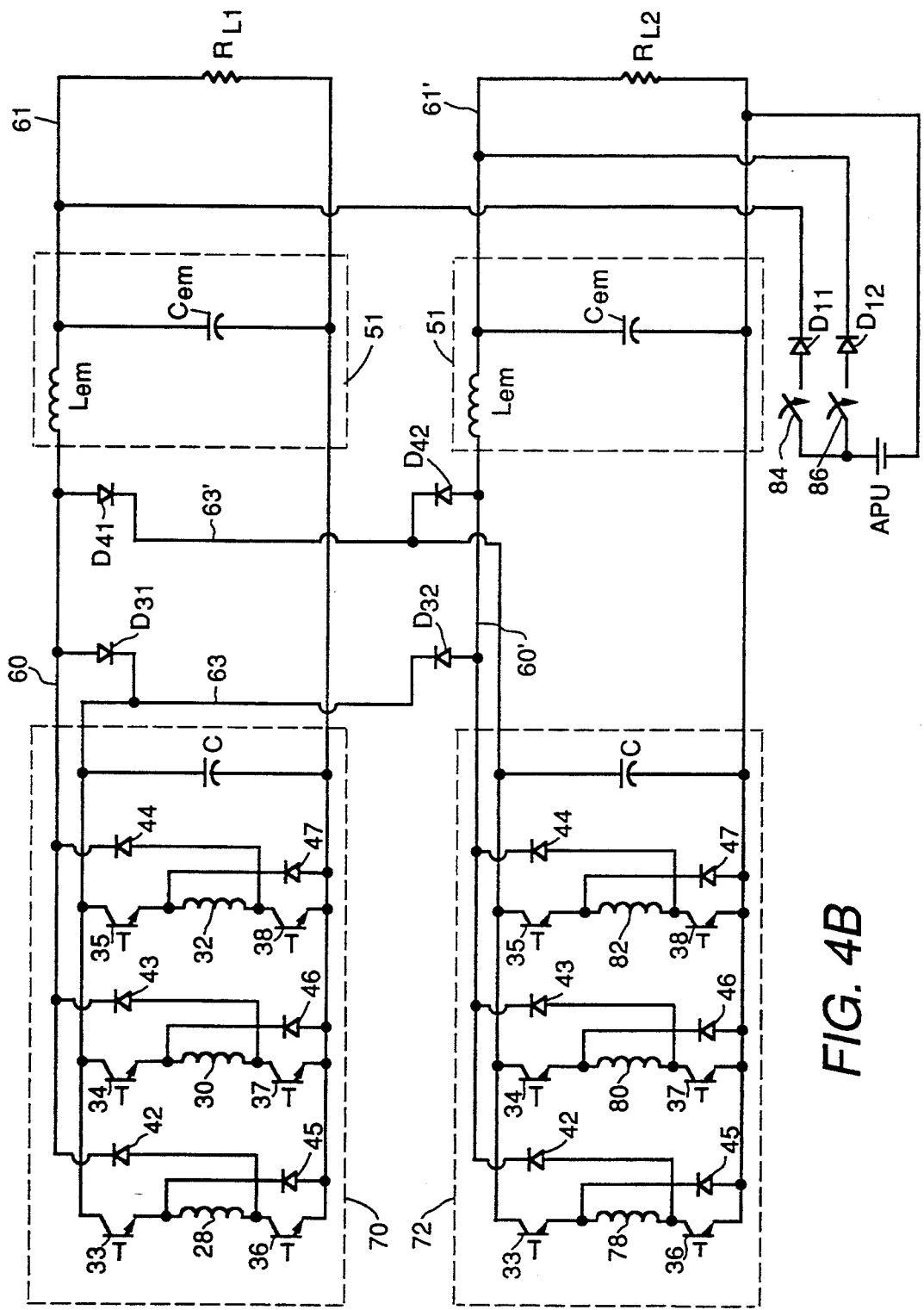

In FIG. 4B, an alternative version of the system of FIG. 4A is illustrated wherein each of the plurality of converters is provided with its own distinct excitation bus. For example, as shown in FIG. 4B, each of the two three-phase converters 70 and 72 has an associated excitation bus 63 and 63', respectively. The system of FIG. 4B further includes diode-OR means for coupling each of the two excitation busses 63 and 63' to the two generator busses 60 and 60' respectively Diodes $D_{31}$ and $D_{32}$ provide this OR coupling function for excitation bus 63; and diodes $D_{41}$ and $D_{42}$ provide this OR coupling function for excitation bus 63'. In operation, this alternative embodiment behaves in much the same way as the embodiment in FIG. 4A. That is, the generator bus having the higher voltage supplies current to both of the excitation busses 63 and 63' in case the voltage on the other generator bus is reduced due to heavy overload conditions or a short-circuit fault. This embodiment extends naturally to configurations with more than two converters, providing the system designer with flexibility regarding how many and which generator busses the designer wishes to couple to each respective excitation bus using the diode-OR configuration.

Figure 5:
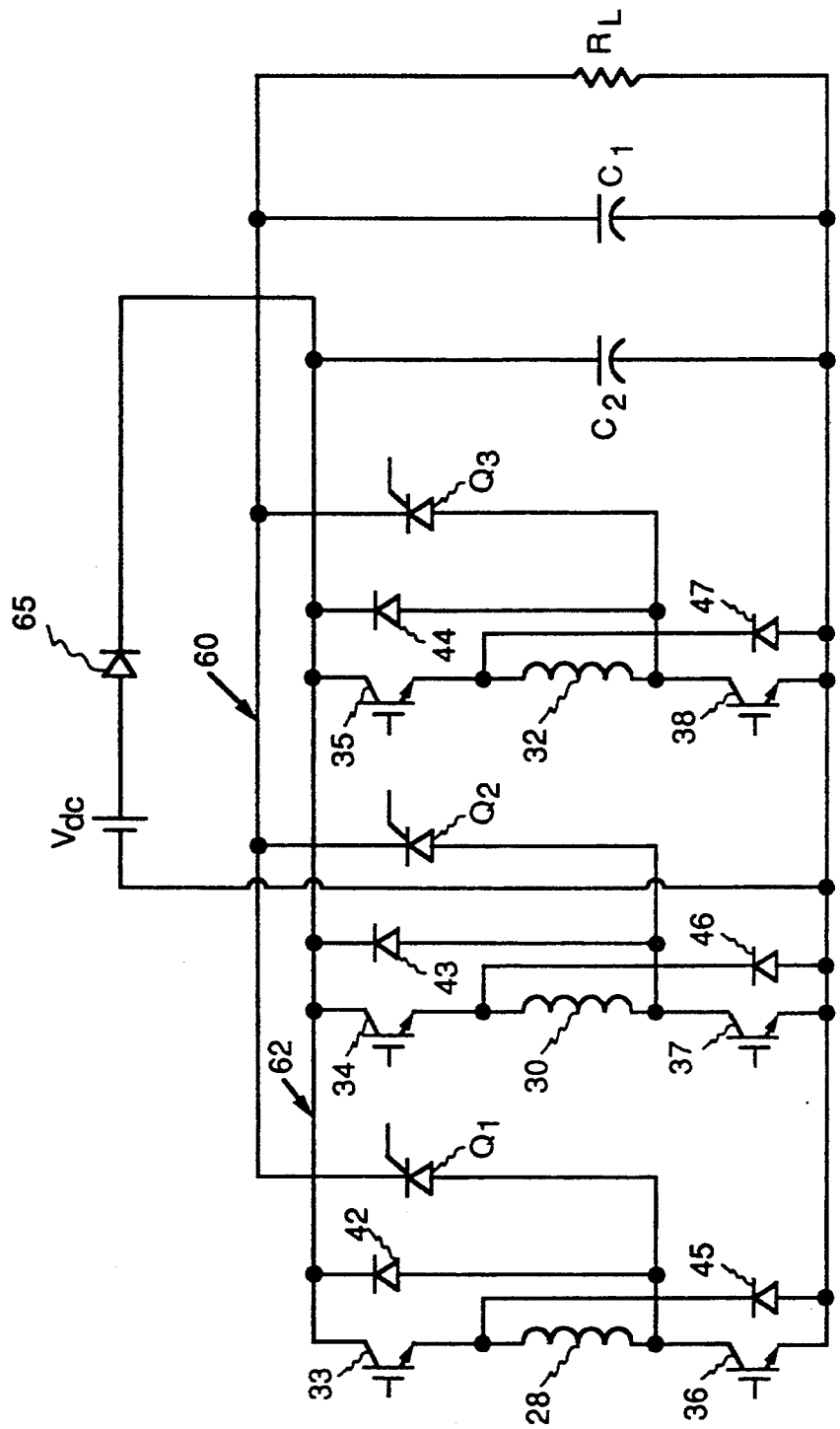
FIG. 5 schematically illustrates a switched reluctance generator system according to the present invention.

FIG. 5 illustrates a switched reluctance generator system according to the present invention. As shown, the cathodes of flyback diodes 42–44 are connected to excitation bus 62, as opposed to being connected to generator bus 60 as in FIGS. 2, 3, 4A and 4B. In addition, each respective machine phase winding 28, 30, and 32, respectively, is coupled to generator bus 60 through controllable switches $Q_1$, $Q_2$ and $Q_3$, respectively,. By way of example, switches $Q_1$, $Q_2$ and $Q_3$ are illustrated as comprising thyristors; however, other suitable switching devices capable of supporting reverse voltage and behaving like a diode once turned on as well as supporting forward voltage when off may be employed. For example, any switch such as an IGBT, MOSFET, or the like, in series with a diode is suitable. Excitation bus 62 is coupled to dc source $V_{dc}$ through a diode 65.

In operation, to initiate generating action, switches $Q_1$, $Q_2$ and $Q_3$ are turned off such that generator bus 60 is effectively disconnected from the generator system; hence, the switched reluctance generator provides power to excitation bus 62. When the excitation bus voltage reaches a predetermined value, switches $Q_1$, $Q_2$ and $Q_3$ are respectively turned on (depending on the order of machine phase excitation) in order to provide the generator power to the generator bus during normal generating operation. Diodes 42–44 prevent the excitation bus from discharging into the generator bus 60 if its voltage is lower than the excitation bus voltage during normal generating operation.

During an excessive overload or short-circuit fault, the generator bus voltage drops to zero, and switches $Q_1$, $Q_2$ and $Q_3$ are turned off, effectively disconnecting generator bus 60, and hence the load, from the generator system, such that the generating power charges the excitation bus. When the excitation bus again reaches the predetermined voltage, switches $Q_1$, $Q_2$ and $Q_3$ are turned on so that the generator can provide current to clear the fault. Diodes 42, 43 and 44 prevent the shorted generator bus 60 from discharging the excitation bus 62. This sequence of first replenishing the excitation bus 62 and then delivering power to the generator bus 60 is repeated until the fault is cleared.

Advantageously, the excitation source $V_{dc}$ is required to provide power to the switched reluctance generator system only to initiate generating action through diode 65. Otherwise, even during load faults, the switched reluctance generator provides the excitation power, without requiring multiple output generator busses. Moreover, the initial energy required to initiate the generating action is relatively low since, with switches $Q_1$, $Q_2$ and $Q_3$ turned off, there is no load on the excitation bus.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A switched reluctance generator system, comprising:
    a switched reluctance generator including a stator having at least one pair of opposing stator poles with a machine phase winding wound thereon and further including a rotor having at least one pair of opposing rotor poles;
    a converter for coupling a dc voltage from a dc power source via a dc excitation bus to said switched reluctance generator and thereby providing power to excite said generator;
    a generator bus for providing the output voltage of said switched reluctance generator, said generator bus being separate and distinct from said dc excitation bus such that the average current generated by said switched reluctance generator is substantially independent of said output voltage; and
    switch means for coupling each said machine phase winding to said generator bus such that said generator provides power to said excitation bus when said switch means is turned off and provides power to said generator bus when said switch means is turned on, said switched reluctance generator being self-excited during normal generating operation after initiation thereof and during load faults.

2. The switched reluctance generator system of claim 1 wherein said converter comprises at least one switching device connected in series with each said machine phase winding.

3. The switched reluctance generator system of claim 2, further comprising flyback diode means coupled to each said machine phase winding, each said flyback diode means being coupled to said excitation bus for preventing said excitation bus from discharging into the respective machine phase winding coupled thereto.

4. The switched reluctance generator system of claim 1, further comprising blocking means for preventing said excitation bus from discharging into said dc source.

* * * * *

UNITED STATES PATENT AND TRADEMARK OFFICE
CERTIFICATE OF CORRECTION

PATENT NO. : 5,404,091
DATED : April 4, 1995
INVENTOR(S) : Arthur V. Radun

It is certified that error appears in the above-indentified patent and that said Letters Patent is hereby corrected as shown below:

Column 1, between lines 9 and 10, insert the following paragraph:

--The U.S. Government has certain rights in this invention as provided for by the terms of Contract No. F33615-90-C-2052 awarded by the United States Air Force.--

Signed and Sealed this

Fifth Day of September, 1995

*Attest:*

BRUCE LEHMAN

*Attesting Officer*         *Commissioner of Patents and Trademarks*